UNITED STATES PATENT OFFICE.

PETER HAEBERLE, OF BROOKLINE, MISSOURI.

MEDICINAL COMPOUND.

SPECIFICATION forming part of Letters Patent No. 303,603, dated August 12, 1884.

Application filed February 4, 1884. (Specimens.)

*To all whom it may concern:*

Be it known that I, PETER HAEBERLE, of Brookline, in the county of Greene and State of Missouri, have invented a new and useful Compound, which compound is fully described in the following specification.

This invention relates to that class of compounds used as medicines; and it consists in a composition formed by mixing balsam of fir, glycerine, balsam of Peru, calamus-root, juniper-berries, blossoms of yarrow, and alcohol.

To prepare the balsam, take one (1) ounce of balsam of fir and pour it into a vessel containing thirteen (13) ounces of alcohol, and shake the vessel until the contents are thoroughly mixed. Then pour into the vessel two and one-half (2½) ounces of glycerine and two (2) ounces of balsam of Peru. Then take another vessel and put into it one-half (½) ounce of calamus-root, one (1) ounce of juniper-berries, and one (1) dram of blossoms of yarrow, and pour into the vessel thirteen (13) ounces of alcohol. Then allow the contents of both vessels to stand or remain unmoved for twelve (12) hours. Then pour all of the fluid contained in the second vessel into the first vessel, leaving the sediment or dregs, (which will be about two and one-half ounces,) which mixture or compound, after remaining unmoved two (2) hours, will be ready for use. Said compound is to be used for colds, cough, sore throat, and for lung diseases, for disease of kidneys, for chronic diseases of the character of running sores, and for sore eyes, to be taken internally for all of said diseases, one tea-spoonful of the compound being a dose for an adult person, dose to be decreased in proportion to age of patient, and to be taken from one to three times a day, according to severity of the disease for which taken, and to be continued until the disease is cured. In addition to taking said medicine internally for colds, cough, and sore throat, apply a table-spoonful of it, to the throat and front part of neck externally, rubbing the neck with small cloth saturated with the fluid, making the external application as often as taken internally. For a running sore, saturate a linen cloth with the medicine and apply to sore, allowing it to remain thereon, rewetting it in the fluid three times a day, and continuing the same until sore is healed. For sore eyes, close the eyes and apply three drops of the fluid to the eye. Apply by rubbing eyelid externally with the finger wet in the fluid.

What I claim as new, and desire to secure by Letters Patent, is—

The combination, in a medicine, of balsam of fir, glycerine, balsam of Peru, calamus-root, juniper-berries, blossoms of yarrow, and alcohol, substantially as described.

In testimony that I claim the above I have hereunto subscribed my name in the presence of two witnesses.

PETER HAEBERLE.

Witnesses:
GEORGE HAEBERLE,
A. M. HAEBERLE.